(12) United States Patent
Huang et al.

(10) Patent No.: US 10,623,378 B2
(45) Date of Patent: *Apr. 14, 2020

(54) DYNAMICALLY ALLOWING TRAFFIC FLOW THROUGH A FIREWALL TO ALLOW AN APPLICATION SERVER DEVICE TO PERFORM MOBILE-TERMINATED COMMUNICATIONS

(71) Applicant: Verizon Patent and Licensing Inc., Arlington, VA (US)

(72) Inventors: Ye Huang, San Ramon, CA (US); James Mathison, Warren, NJ (US); Sudhakar Reddy Patil, Flower Mound, TX (US); Michael R. Waters, Staten Island, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,855

(22) Filed: Mar. 6, 2019

(65) Prior Publication Data

US 2019/0199686 A1    Jun. 27, 2019

Related U.S. Application Data

(63) Continuation of application No. 15/682,134, filed on Aug. 21, 2017, now Pat. No. 10,250,564.

(51) Int. Cl.
*H04L 29/06* (2006.01)
*H04L 29/12* (2006.01)

(52) U.S. Cl.
CPC ........ *H04L 63/029* (2013.01); *H04L 61/2514* (2013.01); *H04L 61/2517* (2013.01);
(Continued)

(58) Field of Classification Search
CPC .............. H04L 63/029; H04L 63/0236; H04L 63/0263; H04L 63/0209; H04L 63/0245;
(Continued)

(56) References Cited

U.S. PATENT DOCUMENTS 7,406,709 B2 * 7/2008 Maher, III ........ H04L 29/12471
709/226
8,082,580 B1 * 12/2011 Desai .................... H04L 63/029
726/14

(Continued)

*Primary Examiner* — Samson B Lemma

(57) ABSTRACT

A network device may receive, a flow control request for a first device that is registered for an internet protocol (IP) pinhole service. The flow control request may include a device identifier associated with the first device and a private IP address. The network device may identify at least one of IP address information, port information, and pinhole rules. The network device may provide, to another network device, a flow control response that includes at least one of the IP address information, the port information, and the pinhole rules. The flow control response may cause the other network device to allow traffic flow through the firewall using at least one of the IP address information and the port information. The network device may provide a public IP address and a port identifier to a second device, allowing the second device to provide traffic to the first device.

18 Claims, 7 Drawing Sheets

(52) U.S. Cl.
CPC ...... *H04L 61/2567* (2013.01); *H04L 61/2582* (2013.01); *H04L 63/0209* (2013.01); *H04L 63/0236* (2013.01); *H04L 63/0263* (2013.01); *H04L 63/0245* (2013.01)

(58) Field of Classification Search
CPC ............. H04L 61/2517; H04L 61/2514; H04L 61/2582; H04L 61/2567
USPC .......................................................... 726/11
See application file for complete search history.

(56) References Cited

U.S. PATENT DOCUMENTS

| | | | | |
|---|---|---|---|---|
| 2002/0199114 | A1* | 12/2002 | Schwartz | H04L 63/029 726/4 |
| 2003/0140142 | A1* | 7/2003 | Marples | H04L 29/12254 709/225 |
| 2003/0227903 | A1* | 12/2003 | Watson | H04L 29/06027 370/352 |
| 2004/0034793 | A1* | 2/2004 | Yuan | G06Q 20/027 726/11 |
| 2005/0201304 | A1* | 9/2005 | Olshansky | H04L 65/104 370/282 |
| 2006/0029083 | A1* | 2/2006 | Kettlewell | H04L 29/12009 370/401 |
| 2007/0101414 | A1* | 5/2007 | Wing | H04L 29/06027 726/5 |
| 2007/0211738 | A1* | 9/2007 | Guo | H04L 29/06027 370/401 |
| 2008/0253373 | A1* | 10/2008 | Ros-Giralt | H04L 45/00 370/392 |
| 2011/0299554 | A1* | 12/2011 | Ros-Giralt | H04L 12/6418 370/469 |
| 2012/0147834 | A1* | 6/2012 | Zisimopoulos | H04L 29/12066 370/329 |

* cited by examiner

DYNAMICALLY ALLOWING TRAFFIC FLOW THROUGH A FIREWALL TO ALLOW AN APPLICATION SERVER DEVICE TO PERFORM MOBILE-TERMINATED COMMUNICATIONS

RELATED APPLICATION

This application is a continuation of U.S. patent application Ser. No. 15/682,134, filed Aug. 21, 2017, which is incorporated herein by reference.

BACKGROUND

Internet protocol (IP) is a communications protocol used for sending and receiving packets over a network. Some devices and/or applications may support various IP versions, such as IP version 6 (IPv6). However, other devices and/or applications may support an older version of IP, such as IP version 4 (IPv4).

DETAILED DESCRIPTION OF PREFERRED EMBODIMENTS

Figure 1A:
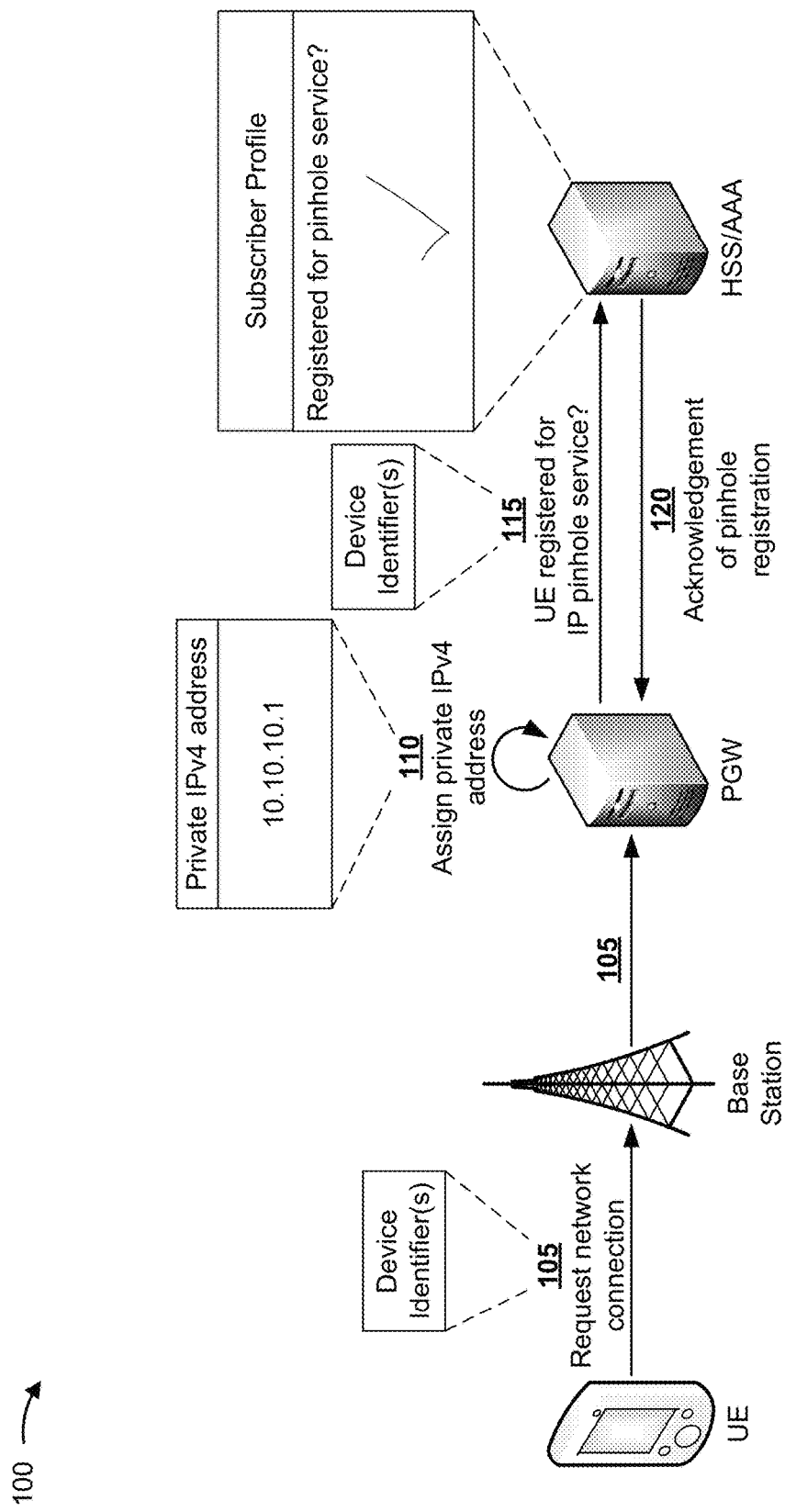
FIGS. 1A-1D are diagrams of an overview of an example implementation described herein.

The following detailed description of example implementations refers to the accompanying drawings. The same reference numbers in different drawings may identify the same or similar elements.

Devices and/or applications may support different versions of IP (e.g., IPv4, IPv6, or the like). Network address translators may translate IP addresses in packets (e.g., from private IPv4 addresses to public IPv4 addresses, from public IPv4 addresses to private IPv4 addresses, or the like).

In some cases, user equipment (UE) may be assigned a static public IPv4 address when the UE establishes a connection to a network. However, assigning a static public IPv4 address to the UE may be difficult when there are a limited number of IPv4 addresses available for assignment. Additionally, if an application server device performs MT communications with the UE over a network, use of a static IPv4 address and port combination may leave the UE vulnerable to attacks by malware. Furthermore, dynamically assigning IPv4 addresses and ports may be difficult when sending MT traffic as the sender device often lacks knowledge of the dynamically assigned IPv4 address needed to reach the destination device.

To address issues of scale, UEs may be assigned a private IPv4 address when establishing a connection to a network, and a network device may use network address translation (NAT) to allow multiple UEs to share a single public IPv4 address. This process may be used to support mobile-originated (MO) communications. However, this process does not support MT communications as there is no mechanism to deliver packets to the UE unless the UE has previously initiated the flow.

Some implementations described herein provide an IP flow controller to instruct a network device or a firewall to allow traffic flow through the firewall to allow an application server device to perform MT communications. For example, the IP flow controller may receive a flow control request for a device (e.g., a UE) that is registered for an IP pinhole service. In this case, the IP flow controller may identify, from the flow control request, a device identifier, a private IPv4 address, and an indication that the device is registered for an IP pinhole service.

Additionally, the IP flow controller may provide a flow control response to a firewall (or to a device hosting the firewall) to allow the firewall to be configured to allow traffic flow associated with MT communications. For example, a firewall configuration may use network address and port translation (NAPT) to translate a public IPv4 address and public port identifier to the private IPv4 address and private port identifier. When the firewall is configured, the IP flow controller may provide the public IPv4 address and public port identifier to an application server device, allowing the application server device to perform MT communications via the firewall. Furthermore, the public IPv4 address and ephemeral public port are dynamically assigned to the UE, and remain assigned to the UE for a limited time period. When the time period expires, the public IPv4 address and ephemeral public port may be available for use by a different UE.

In this way, the IP flow controller enables the firewall to allow an application server device to perform MT communications with limited vulnerability to malware. Additionally, network devices may continue to assign private IPv4 addresses (e.g., to solve the scarcity issue relating to public IPv4 addresses), while also supporting MT communications. Furthermore, allowing traffic flow via the ephemeral port (e.g., port 15,000+) improves network security as the ephemeral port is unlikely to be detected or probed by malware.

In the description to follow, implementations may be described in the context of IPv4 translations. In practice, one or more of these implementations may apply equally to translations in another version of IP (e.g., a private IPvX address may be translated to a public IPvX address, a public IPvX address may be translated to a private IPvX address, etc.).

FIGS. 1A-1D are diagrams of an overview of an example implementation 100 described herein. Example implementation 100 may include user equipment (UE), a base station, a packet data network (PDN) gateway (PGW), a home subscriber server/authentication authorization and accounting (HSS/AAA) server, an internet protocol (IP) flow controller, and an application server device. In example implementation 100, the IP flow controller and the PGW may perform one or more actions to dynamically open a pinhole in a firewall to allow the application server device to perform MT communications with the UE.

As shown in FIG. 1A, and by reference number 105, the UE may request a network connection. The request for the network connection may be provided to the PGW via the base station. The request for the network connection may include one or more device identifiers (e.g., an international mobile subscriber identifier (IMSI) (shown as IMSI #123), a mobile directory number (MDN), a mobile station international subscriber directory number (MSISDN), etc.). As shown by reference number 110, the PGW may receive the request for the network connection, and may dynamically assign a private IPv4 address (e.g., "10.10.10.1") to the UE.

As shown by reference number 115, the PGW may search the HSS/AAA to determine whether the UE is registered for an IP pinhole service. An IP pinhole service may be a service that allows a device (e.g., the UE, the application server device, etc.) to send and/or receive traffic through a firewall (e.g., by opening a port to allow traffic flow). The pinhole service may be statically created, such that traffic flow to a registered UE does not need to be created by a MO communication. For example, the PGW may use the device identifier associated with the UE to query the HSS/AAA server for a subscriber profile that is associated with the device identifier. The subscriber profile may indicate whether the UE is registered for the pinhole service.

As shown by reference number 120, the HSS/AAA server may provide an acknowledgement of pinhole registration to the PGW. The acknowledgement may indicate that the UE is registered for an IP pinhole service.

Figure 1B:
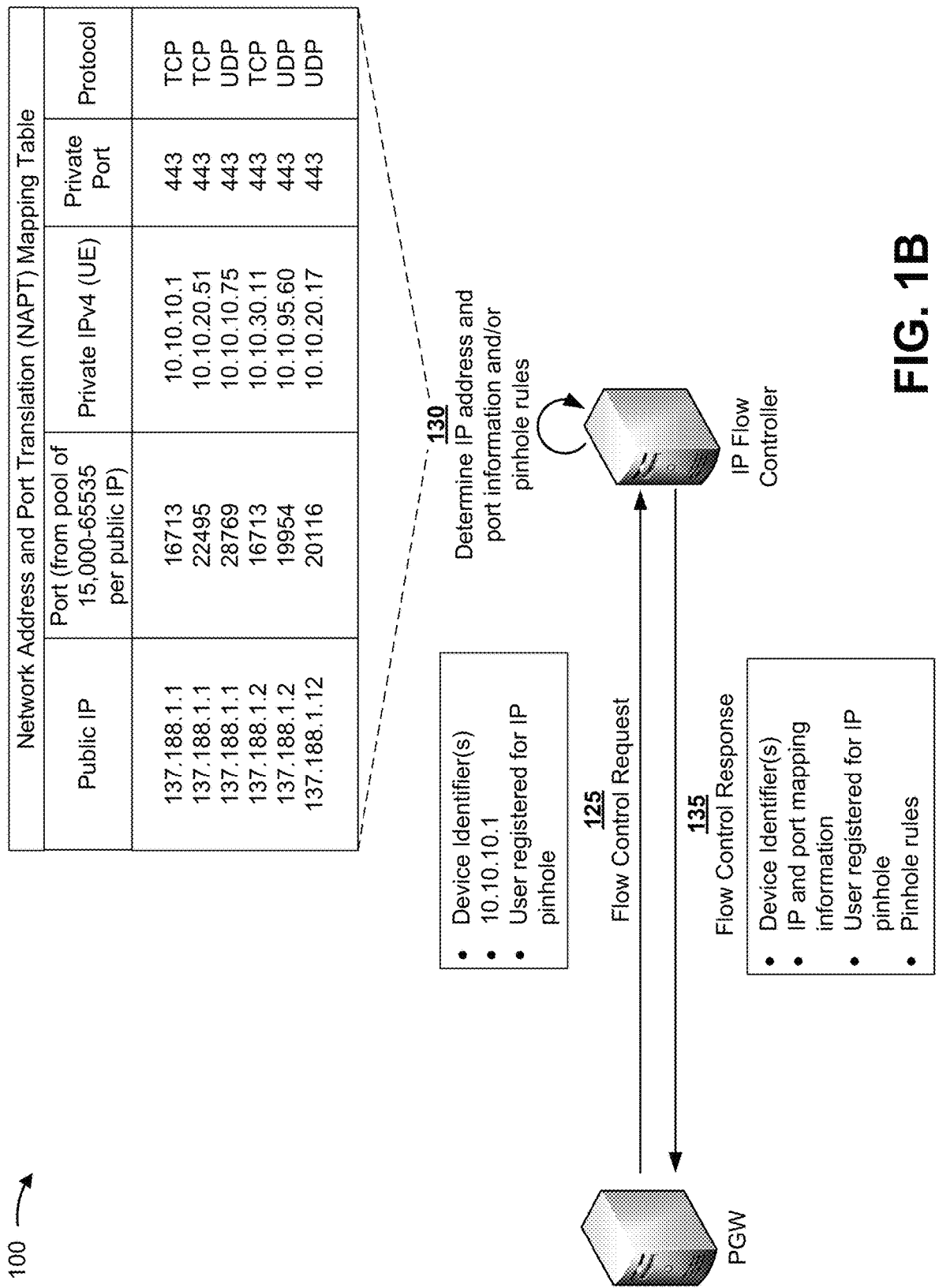

As shown in FIG. 1B, and by reference number 125, the PGW may provide, to the IP flow controller, a flow control request for a UE that has subscribed to the IP pinhole service. The flow control request may include the one or more device identifiers for the UE, the private IPv4 address that the PGW assigned to the UE (e.g., "10.10.10.1"), and the information indicating that the UE is registered for an IP pinhole.

As shown by reference number 130, the IP flow controller may determine IP address information, port information, and/or one or more pinhole rules that may be used to support MT communications. For example, the IP flow controller may search a network address and port translation (NAPT) mapping table to identify a public IPv4 address and public port identifier that are available (e.g., 137.188.1.1, 16713). In this case, the IP flow controller may associate the private IPv4 address with the identified public IPv4 address (e.g., by storing the values together in a data structure) to allow network devices to identify the user device as the proper destination (e.g., for sending MT traffic from the application server device to the user device).

Additionally, the IP flow controller may determine port information. For example, the IP flow controller may determine a public port identifier. As an example, the IP flow controller may use a random number generator or other means to select a public port identifier from a pool of available port identifiers. In this case, the IP flow controller may select a public port identifier from a range of port identifiers (e.g., port identifiers associated with port 15,000-65,535). Additionally, the IP flow controller may determine a private port identifier. For example, the IP flow controller may determine a private port identifier based on MT application details (e.g., a type of protocol used for sending packets associated with an MT application flow).

In this way, the IP flow controller is able to determine IP address and port information that may be used to support MT traffic via the network. Additionally, by selecting a public port identifier over port 15,000, the IP flow controller may improve network security because malware often searches for common ports (e.g., port 80, port 443, etc.).

Additionally, the IP flow controller may identify pinhole rules. For example, the IP flow controller may identify the pinhole rules by using the device identifier to query a data structure that associates device identifiers and pinhole rules (e.g., a data structure stored associated with the IP flow controller, the HSS/AAA, etc.). The pinhole rules may include an access rule indicating devices that are allowed to access the pinhole (or that are disallowed from accessing the pinhole), a duration rule indicating a time period for which to keep the pinhole open, and/or the like.

As shown by reference number 135, the IP flow controller may provide a flow control response to the PGW. For example, the IP flow controller may provide a flow control response that includes the one or more device identifiers, IP and port mapping information (e.g., associations between IPv4 addresses and ports, such as an association between public IPv4 address 137.188.1.1 and private IPv4 address 10,10,10,1, an association between port identifier 16713 and port identifier 443), and/or the pinhole rules.

Figure 1C:
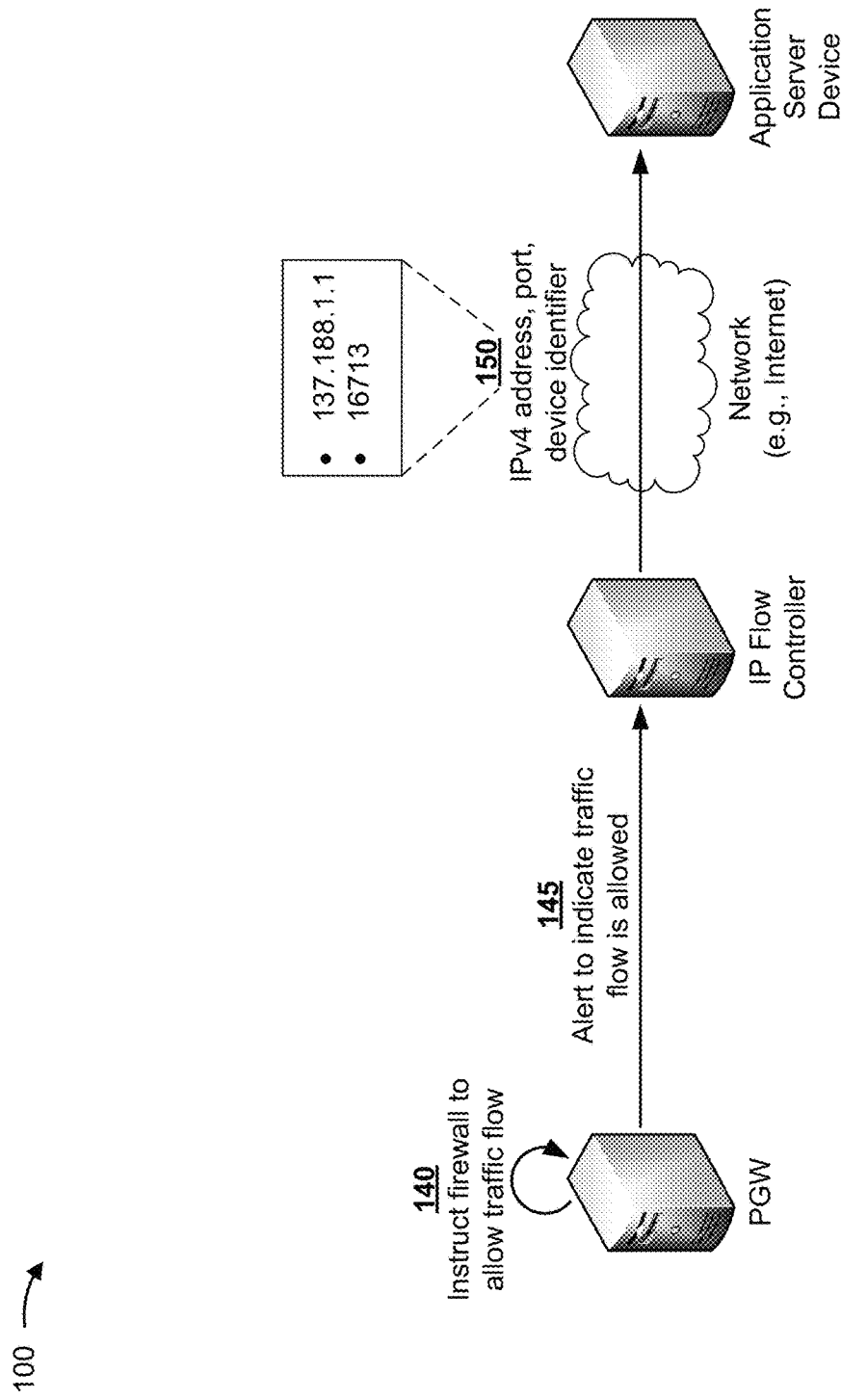

As shown in FIG. 1C, and by reference number 140, the PGW may instruct a firewall to allow traffic flow through the firewall. For example, the PGW may use the information included in the flow control response to instruct a firewall installed on the PGW or located external to the PGW to create a pinhole that allows traffic flow through the firewall. In this case, the firewall may create a pinhole that identifies allowed IP addresses and ports and/or provides NAPT information for the allowed IP addresses and ports. For example, the pinhole may identify the public IPv4 address (137.188.1.1) and port (16713) and the private IPv4 address (10.10.10.1) and port (443) that will be used for NAPT. Additionally, one or more firewall configuration settings may be used to apply pinhole access rules and/or pinhole duration rules, as described further herein.

As shown by reference number 145, the PGW may provide, to the IP flow controller, an alert to indicate that traffic flow is allowed (e.g., because the pinhole is active). As shown by reference number 150, once the IP flow controller receives the alert, the IP flow controller may provide, to the application server device, the public IPv4 address (e.g., 137.188.1.1), the port identifier (e.g., 16713), a device identifier, of the one or more device identifiers, and/or the like.

Figure 1D:
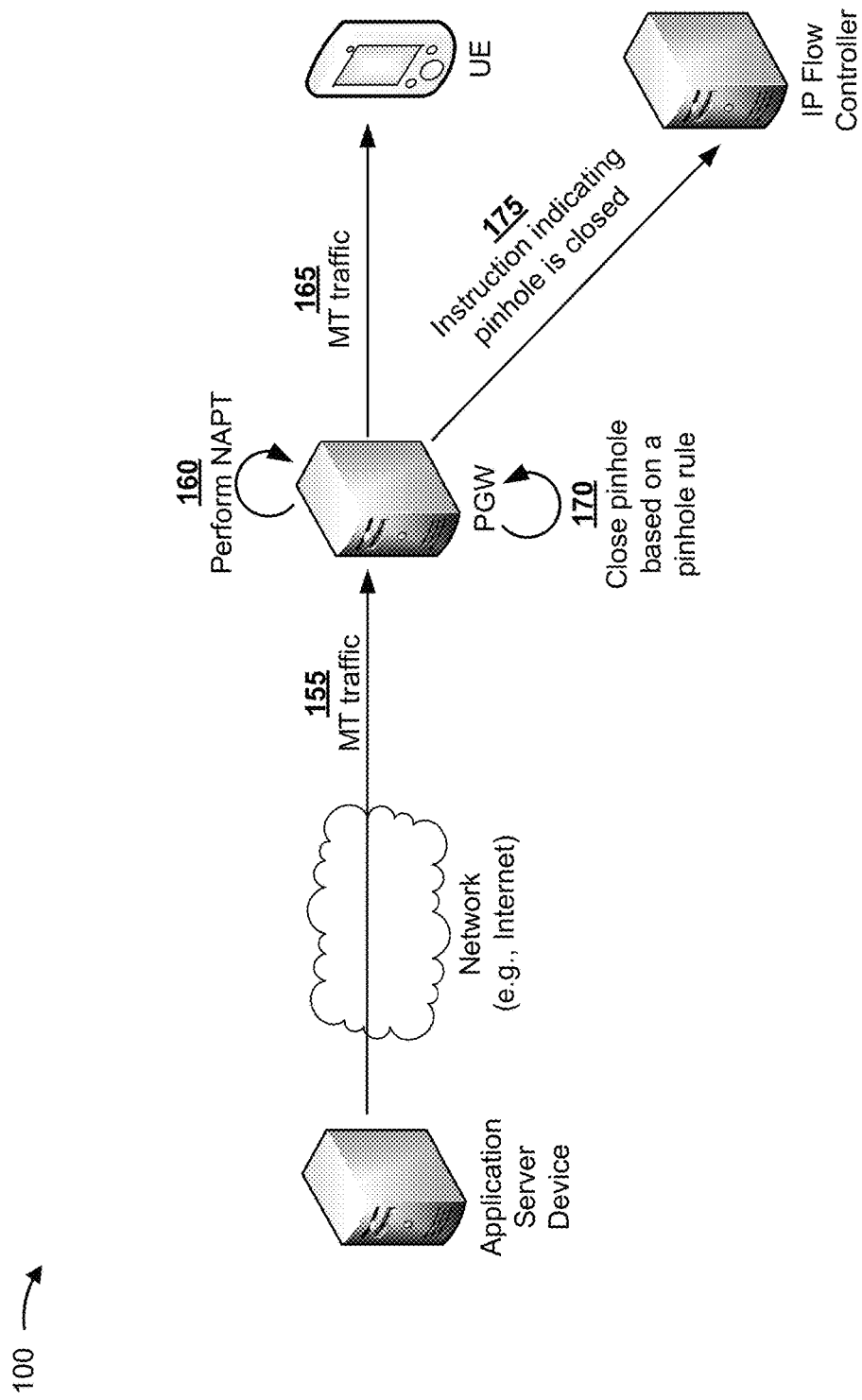

As shown in FIG. 1D, and by reference number 155, the application server device may provide MT traffic to the PGW. For example, the application server device may use the public IPv4 address and the port identifier to provide the MT traffic to the PGW (e.g., via a network, such as the Internet).

As shown by reference number 160, the PGW may perform NAPT. For example, the IP flow controller may translate the public IPv4 address (e.g., 137.188.1.1) to the private IPv4 address (e.g., 10.10.10.1) and may translate the port identifier (e.g., 16713) to a UE-specific port identifier (e.g., port 443). As shown by reference number 165, the PGW may provide the MT traffic to the UE. For example, the PGW may provide the MT traffic to the UE using the private IPv4 address (e.g., 10.10.10.1) and the UE-specific port identifier (e.g., port 443).

As shown by reference number 170, the PGW may close the pinhole based on a pinhole rule. For example, the PGW may provide an instruction to the firewall to close the pinhole based on an indication that the UE has terminated the network connection, using a fixed time period, a request from the application server device to close the pinhole, detection of an attempted unauthorized entry to the pinhole, and/or the like. In this case, the firewall may remove the IP address and port information from the list of allowed IP addresses and port identifiers, and may remove pinhole rules from configuration settings associated with the pinhole. Alternatively, the firewall may be configured to automatically apply a pinhole duration rule, and may close the pinhole without the PGW. In this case, the firewall may instruct the PGW that the pinhole has been closed, to allow the PGW to instruct the IP flow controller to update the NAPT mapping table. Alternatively, the IP flow controller may monitor a pinhole duration rule, and, based on the pinhole duration rule, may provide an instruction to the PGW to close the pinhole.

In some cases, the IP flow controller may orchestrate closing the pinhole. For example, the user device may provide an instruction to the IP flow controller that the pinhole is no longer needed. In this case, the IP flow controller may provide an instruction to the PGW to close the pinhole, and the PGW may instruct the firewall to update the firewall configuration settings to close the pinhole.

As shown by reference number 175, the PGW may provide an instruction to the IP flow controller indicating that the pinhole is closed. For example, the PGW may provide the instruction to allow the IP flow controller to update the NAPT mapping table so that the public IPv4 address and port identifier may be re-used for other UEs.

In this way, the IP flow controller may enable a firewall to create a pinhole that allows the application server device to perform MT communications. Furthermore, by creating a pinhole using a port identifier (e.g., port 15,000+), the IP flow controller improves network security by allowing traffic flow via the pinhole that is unlikely to be detected by malware.

As indicated above, FIGS. 1A-1D are provided merely as an example. Other examples are possible and may differ from what was described with regard to FIGS. 1A-1D. For example, instead of using the UE establishing a network connection to begin the data flow, the application server device may make one or more application programming interface (API) calls to the IP flow controller to request that the IP flow controller request for a pinhole. Additionally, a network infrastructure may include a set of PGWs (e.g., rather than one PGW, a network infrastructure may include five PGWs, ten PGWs, a hundred PGWs, etc.). In this case, a UE may connect to the network via a particular PGW, and may be assigned a public IP address associated with the particular PGW. Here, each PGW of the set of PGWs may use a separate set of public IP addresses, and the IP flow controller may assign the UE a public IP address from a set of public IP addresses associated with the particular PGW.

The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
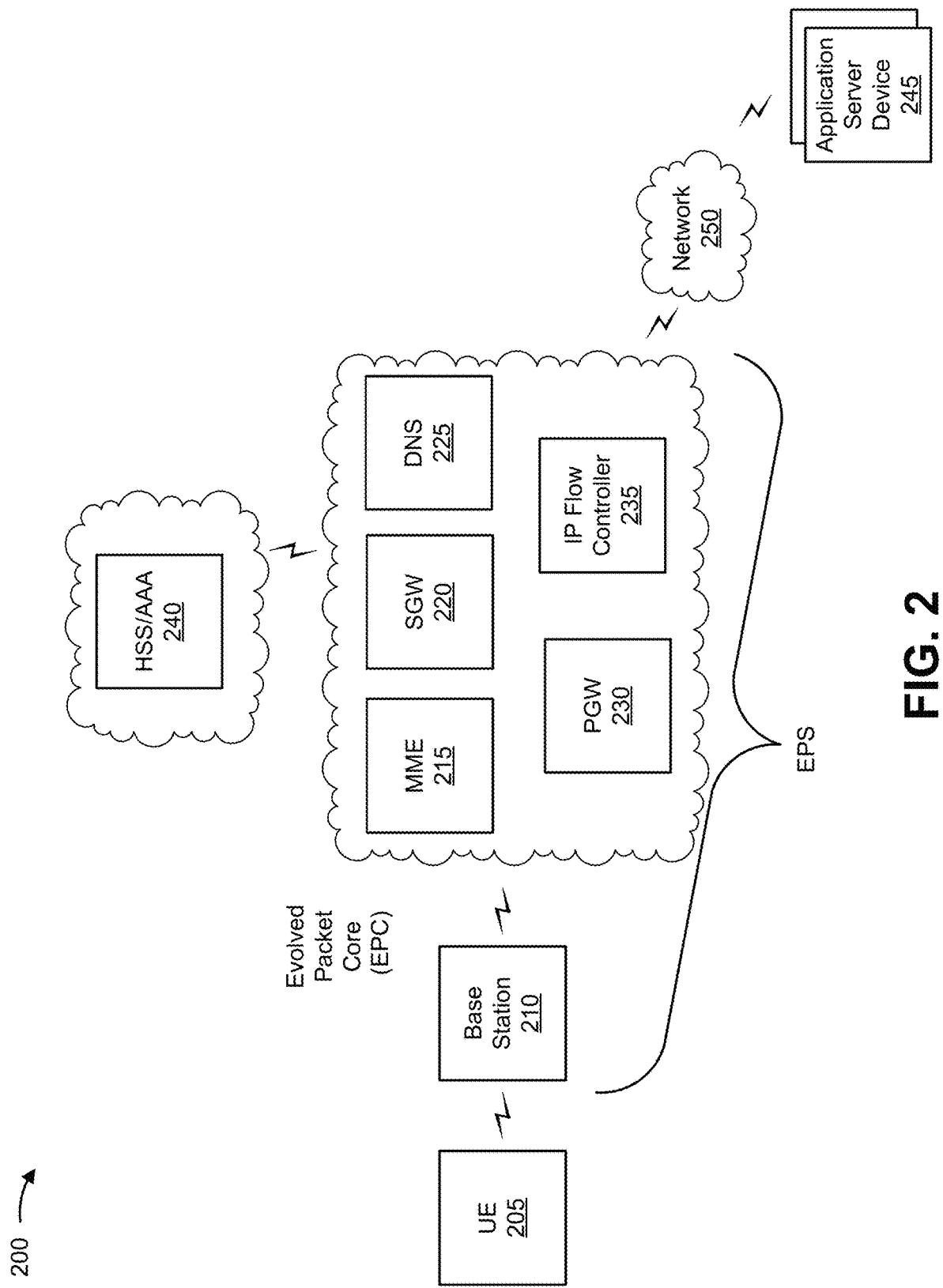
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a UE 205, a base station 210, a mobility management entity (MME) 215, a serving gateway (SGW) 220, a domain name server (DNS) 225, a PGW 230, an IP flow controller 235, a HSS/AAA 240, an application server device 245, and/or a network 250. Devices of environment 200 may interconnect via wired connections, wireless connections, or a combination of wired and wireless connections.

UE 205 includes one or more devices capable of receiving, storing, processing, and/or providing packets. For example, UE 205 may include a communication device, such as a mobile phone (e.g., a smart phone or a radiotelephone), a tablet computer, a wearable communication device (e.g., a smart wristwatch or a pair of smart eyeglasses), a desktop computer, a server computer, or a similar type of device. In some implementations, UE 205 may provide, to PGW 230, a request to establish a network connection. In some implementations, UE 205 may receive MT traffic from application server device 245, using PGW 230 as an intermediary.

Base station 210 includes one or more devices capable of transferring traffic (e.g., packets), such as audio, video, text, and/or other traffic, destined for and/or received from UE 205. In some implementations, base station 210 may include an evolved node B (eNB) associated with the long term evolution (LTE) network that receives traffic from and/or transmits traffic to network 250 via SGW 220 and/or PGW 230. Additionally, or alternatively, one or more base stations 210 may be associated with a RAN that is not associated with an LTE network. Base station 210 may transmit traffic to and/or receive traffic from UE 205 via an air interface (e.g., a radio frequency (RF) signal).

MME 215 includes one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 230 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 may aggregate traffic received from one or more base stations 210 associated with the LTE network, and may transmit the aggregated traffic to network 250 (e.g., via PGW 230) and/or other network devices associated with the evolved packet core (EPC) and/or the IP multimedia subsystem (IMS) core. Additionally, or alternatively, SGW 220 may receive traffic from network 250 and/or other network devices, and may transmit the received traffic to UE 205 via base station 210. Additionally, or alternatively, SGW 220 may perform operations associated with handing off UE 205 to and/or from an LTE network.

DNS 225 includes one or more devices capable of receiving, storing, processing, and/or providing information associated with domain names. For example, DNS 225 may include a server or a group of servers. In some implementations, DNS 225 may receive a domain name, and may translate the domain name to an IP address. In some implementations, DNS 225 may provide the IP address to PGW 230.

PGW 230 includes one or more devices capable of providing connectivity for UE 205 to external packet data networks (e.g., other than the depicted EPC and/or LTE network), such as network 250. For example, PGW 230 may include one or more data processing and/or traffic transfer devices, such as a gateway, a router, a modem, a switch, a firewall, a NIC, a hub, a bridge, a server device, or any other type of device that processes and/or transfers traffic. In some implementations, PGW 230 may aggregate traffic received from one or more SGWs 220, and may transmit the aggregated traffic to network 250. Additionally, or alternatively, PGW 230 may receive traffic from network 250, and may transmit the traffic to UE 205 via SGW 220 and base station 210. PGW 230 may record data usage information (e.g., byte usage), and may provide the data usage information to HSS/AAA 240.

In some implementations, PGW 230 may receive, from UE 205, a request to establish a network connection. In some implementations, PGW 230 may determine whether UE 205 is registered for a pinhole service by querying HSS/AAA 240. In some implementations, PGW 230 may provide a flow control request to IP flow controller 235. In some implementations, PGW 230 may create a pinhole, or, alternatively, may provide a request to a firewall associated with PGW 230 to create a pinhole. In some implementations, PGW 230 may provide an alert indicating that a pinhole is active to IP flow controller 235. In some implementations, PGW 230 may host a firewall. In some implementations, PGW 230 may interact with a firewall supported by another network device.

IP flow controller 235 includes one or more devices capable of receiving, storing, processing, and/or providing information associated with a pinhole. For example, IP flow controller 235 may include one or more data processing and/or traffic transfer devices, such as a gateway, a router, a modem, a switch, a firewall, a NIC, a hub, a bridge, a server device, or any other type of device that processes and/or transfers traffic. In some implementations, IP flow controller 235 may be hosted within a service capability exposure function (SCEF) device. In some implementations, IP flow controller 235 may provide a flow control response to PGW 230. In some implementations, IP flow controller 235 may provide a public IPv4 address and a port identifier to application server device 245. In some implementations, IP flow controller 235 may provide, to PGW 230, a request to close a pinhole. In some implementations, IP flow controller 235 may obtain information associated with an IP pinhole service by querying a subscriber profile of HSS/AAA 240, a data structure within IP flow controller 235, a data structure of another device, and/or the like.

HSS/AAA 240 includes one or more devices, such as one or more server devices, capable of managing (e.g., receiving, generating, storing, processing, and/or providing) information associated with UE 205. For example, HSS/AAA 240 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), information that identifies whether UE 205 is associated with an RF access signaling usage control policy and/or an RF access signaling usage billing policy, and/or similar information. HSS/AAA 240 may provide this information to one or more other devices of environment 200 to support the operations performed by those devices. In some implementations, HSS/AAA 240 may store information associated with an IP pinhole service in a subscriber profile of UE 205.

Additionally, or alternatively, HSS/AAA 240 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, RF access signaling usage restrictions, etc.), may track resources consumed by UE 205 (e.g., a quantity of voice minutes consumed, a quantity of data consumed, a quantity of RF signals transmitted, a quantity of radio access bearers requested and/or established, etc.), and/or may perform similar operations.

Application server device 245 includes one or more devices capable of receiving, storing, processing, and/or providing information associated with a pinhole. For example, application server device 245 may include a server device or a group of server devices. In some implementations, application server device 245 may be a part of the network used to support base station 210, MME 215, SGW 220, DNS 225, PGW 230, IP flow controller 235, and/or HSS/AAA 240. In some implementations, application server device 245 may be part of a different network (e.g., enterprise network). In some implementations, application server device 245 may receive a public IPv4 address and a port identifier from PGW 230 and/or IP flow controller 235. In some implementations, application server device 245 may provide MT traffic to UE 205 using the public IPv4 address and the port identifier (e.g., that are associated with a pinhole).

Network 250 includes one or more wired and/or wireless networks. For example, network 250 may include a cellular network (e.g., a 5G network, a 4G network, such as a LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
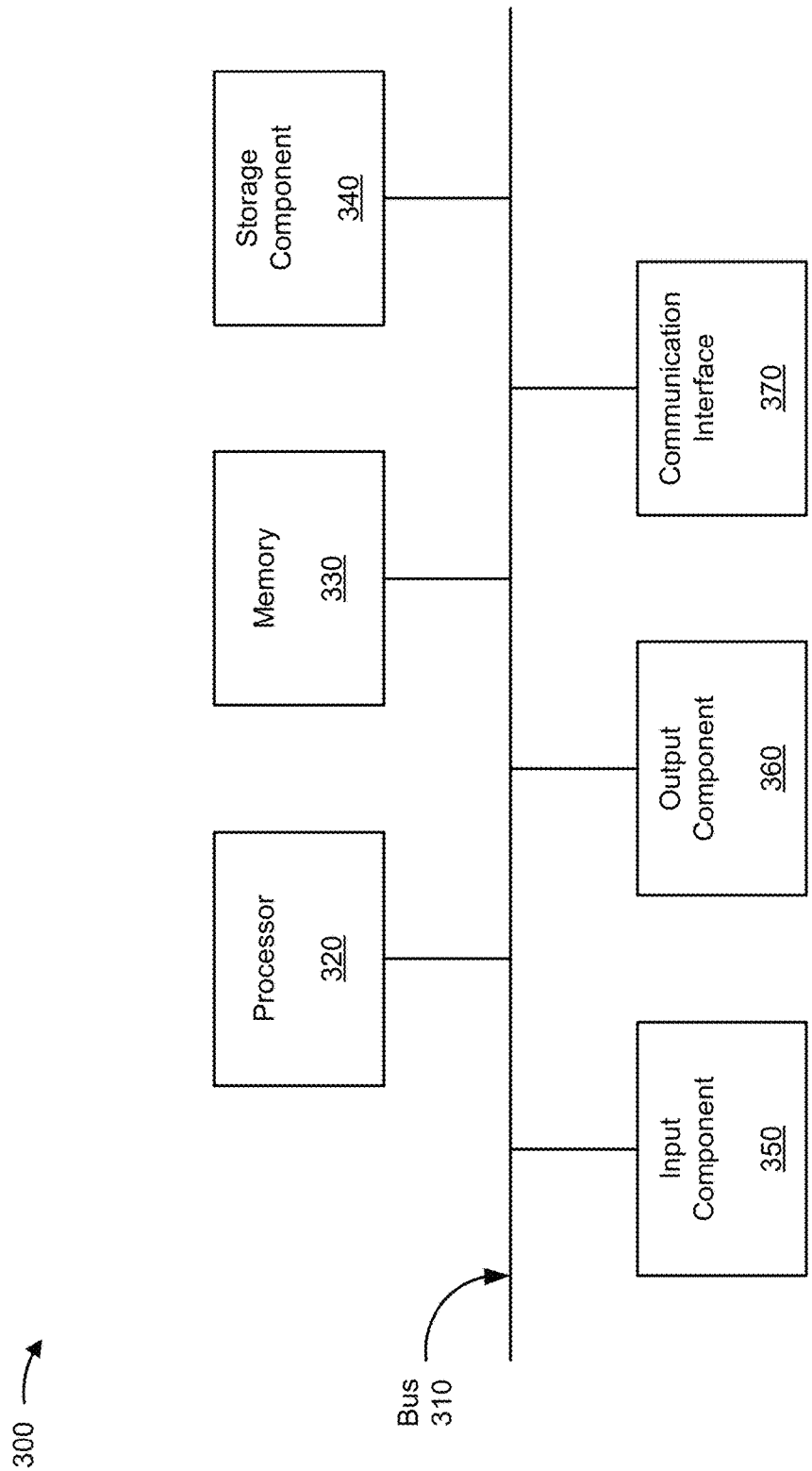
FIG. 3 is a diagram of example components of one or more devices of FIG. 2.

FIG. 3 is a diagram of example components of a device 300. Device 300 may correspond to base station 210, MME 215, SGW 220, DNS 225, PGW 230, IP flow controller 235, HSS/AAA 240, and/or application server device 245. In some implementations, base station 210, MME 215, SGW 220, DNS 225, PGW 230, IP flow controller 235, HSS/AAA 240, and/or application server device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
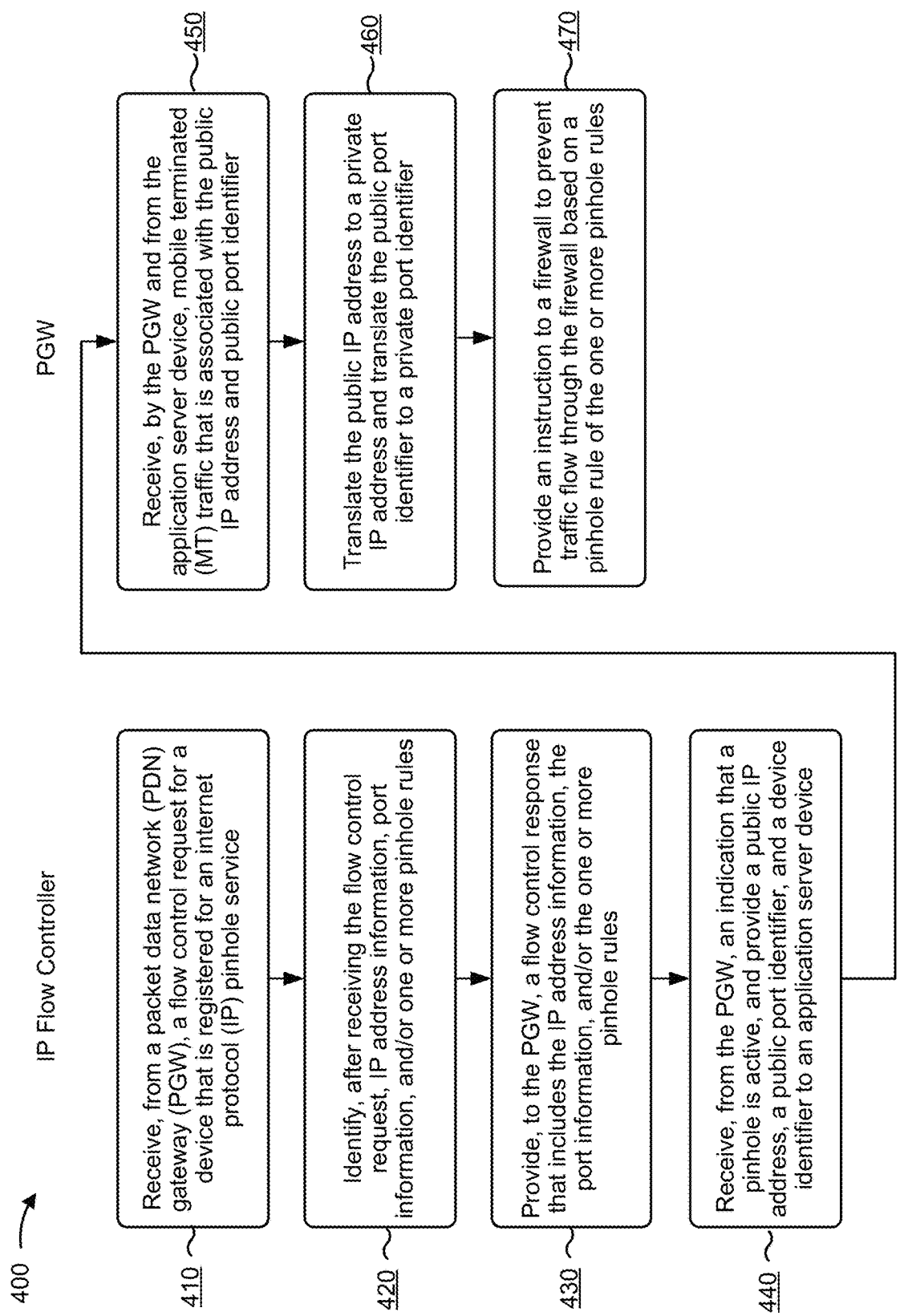
FIG. 4 is a flow chart of an example process for instructing a network device or a firewall to allow traffic flow through the firewall to allow an application server device to perform Mobile-Terminated (MT) communications.

FIG. 4 is a flow chart of an example process 400 for instructing a network device or a firewall to allow traffic flow through the firewall to allow an application server device to perform Mobile-Terminated (MT) communications. In some implementations, one or more process blocks of FIG. 4 may be performed by IP flow controller 235. In some implementations, one or more process blocks of FIG. 4 may be performed by another device or a group of devices separate from or including IP flow controller 235, such as UE 205, base station 210, MME 215, SGW 220, DNS 225, PGW 230, HSS/AAA 240, and/or application server device 245.

As shown in FIG. 4, process 400 may include receiving, from a packet data network (PDN) gateway (PGW), a flow control request for a device that is registered for an internet protocol (IP) pinhole service (block 410). For example, IP flow controller 235 may receive, from PGW 230, a flow control request for a device (e.g., UE 205) that is registered for an IP pinhole service that allows traffic flow through a firewall using a pinhole (e.g., a port opened to allow the traffic flow). The flow control request may include a device identifier (e.g., an international mobile subscriber identifier (IMSI), a mobile directory number (MDN), a mobile station international subscriber directory number (MSISDN), etc.), a private IP address associated with UE 205, an indication of whether UE 205 is registered for the IP pinhole service, and/or the like.

In some implementations, prior to IP flow controller 235 receiving the flow control request, PGW 230 may determine whether UE 205 is registered for the IP pinhole service. For example, when PGW 230 receives the request to establish a network connection, PGW 230 may use the device identifier to query HSS/AAA 240 for a subscriber profile with a matching device identifier, and may analyze (e.g., parse) the subscriber profile to determine whether the device is registered for the IP pinhole service. In some implementations, PGW 230 may provide an indication of whether UE 205 is registered for the IP pinhole service as part of the IP flow control request. In this way, PGW 230 may determine whether UE 205 is registered for the IP pinhole service.

In some implementations, if PGW 230 is not configured to determine whether UE 205 is registered for the IP pinhole service, then IP flow controller 235 may determine whether UE 205 is registered for the IP pinhole service. In this case, IP flow controller 235 may query subscriber profiles stored by HSS/AAA 240 in the same manner described above. For example, using the device identifier associated with UE 205, IP flow controller 235 may query HSS/AAA 240 to search for a subscriber profile that indicates whether a subscriber is registered for the IP pinhole service. In some implementations, rather than having IP flow controller 235 search subscriber profiles stored by HSS/AAA 240 for information indicating whether UE 205 is registered for the IP pinhole service, IP flow controller 235 may locally store the information indicating whether UE 205 is registered for the IP pinhole service (e.g., using a data structure).

In this way, IP flow controller 235 may receive a flow control request that may be further processed to determine information that may be used in creating a pinhole.

As further shown in FIG. 4, process 400 may include identifying, after receiving the flow control request, IP address information, port information, and/or one or more pinhole rules (block 420). For example, IP flow controller 235 may identify IP address information and port information using a NAPT mapping table, and may identify one or more pinhole rules by accessing a data structure, as described further herein. The IP address information may include the private IP address and a public IP address. The port information may include the private port identifier and a public port identifier. The one or more pinhole rules may include an access rule (e.g., all devices may access the pinhole, some devices may access the pinhole, some devices are prevented from accessing the pinhole, etc.), a duration rule (e.g., a time period for which to keep the pinhole open), and/or the like.

In some implementations, IP flow controller 235 may identify a public IP address for UE 205 and a public port identifier to use for the IP pinhole service. For example, IP flow controller 235 may translate the private IP address and private port identifier associated with the flow control request to a public IP address and a public port identifier. In this case, IP flow controller 235 may select, from a NAPT mapping table that stores available public IP addresses and public port identifiers, a public IP address and a public port identifier. Additionally, IP flow controller 235 may associate the private IP address with the identified public IP address and may associate the private port identifier with the public port identifier.

In some cases, IP flow controller 235 may select a public port identifier associated with an ephemeral port. For example, IP flow controller 235 may select a public port identifier by selecting from a set of available public port identifiers that are higher than a threshold port number (e.g., ports above port 15,000). By selecting a public port identifier associated with an ephemeral port, traffic flow through the pinhole may be less likely to be located by malware, thereby improving network security.

In some implementations, IP flow controller 235 may identify one or more pinhole rules. For example, IP flow controller 235 may identify one or more pinhole rules by obtaining the rules from a subscriber profile (e.g., using HSS/AAA 240). Alternatively, IP flow controller 235 may identify one or more pinhole rules by searching a data structure local to IP flow controller 235.

In some implementations, IP flow controller 235 may identify one or more access rules. For example, IP flow controller 235 may identify an access rule indicating to allow all devices to access the pinhole, an access rule indicating to allow some devices access to the pinhole, an access rule indicating to prevent some devices from accessing the pinhole, or the like. As an example, IP flow controller 235 may identify an access rule that only allows devices to access the pinhole if the devices IP addresses are provided in an access list.

In some implementations, IP flow controller 235 may identify one or more duration rules. For example, IP flow controller 235 may identify a duration rule indicating to keep a pinhole open until UE 205 terminates the network connection. In some implementations, IP flow controller 235 may identify a duration rule indicating to keep the pinhole open for a fixed time period (e.g., a fixed period of time, a fixed period of idle time in which the pinhole is not used, etc.). In some implementations, IP flow controller 235 may identify a duration rule indicating to keep the pinhole open until application server device 245 requests to close the pinhole. In some implementations, IP flow controller 235 may identify a duration rule indicating to keep the pinhole open unless an attempted unauthorized entry to the pinhole is detected. In some implementations, IP flow controller 235 may identify a set of duration rules including any combination of the above mentioned duration rules.

In this way, IP flow controller 235 may identify IP address information, port information, and/or one or more pinholes rules that may be provided to a firewall to allow traffic flow associated with MT communications.

As further shown in FIG. 4, process 400 may include providing, to the PGW, a flow control response that includes the IP address information, the port information, and/or the one or more pinhole rules (block 430). For example, IP flow controller 235 may provide, to PGW 230, a flow control response, causing PGW 230 to update a firewall to allow traffic flow associated with MT communications.

In some implementations, PGW 230 may update a firewall. For example, PGW 230 may use the IP address information, the port information, and/or the one or more pinhole rules to update the firewall. In this case, the firewall may include firewall configuration settings that PGW 230 may update to allow traffic to flow through the firewall. For example, the firewall may prevent traffic flow unless ports are configured to allow traffic flow, and PGW 230 may update the firewall configuration settings to allow traffic to flow through the firewall if the traffic includes the IP address information and/or the port information.

By providing the flow control response to PGW 230, PGW 230 is able to configure the firewall to allow traffic flow via the IP address information, the port information, and/or the one or more pinhole rules.

As further shown in FIG. 4, process 400 may include receiving, from the PGW, an indication that a pinhole is active, and providing a public IP address, a public port identifier, and a device identifier to an application server device (block 440). For example, IP flow controller 235 may receive, from PGW 230, an indication that a pinhole is active, which may cause IP flow controller 235 to provide, to application server device 245, the public IP address, the public port identifier, and the device identifier of UE 205.

In some implementations, after receiving the indication that the pinhole is active, IP flow controller 235 may provide the public IP address and public port identifier to application server device 245. For example, IP flow controller 235 may provide the public IP address, the public port identifier, and the device identifier of UE 205 to application server device 245 to allow application server device 245 to provide MT traffic to UE 205.

In this way, IP flow controller 235 is able to provide application server device 245 with information that may be used to provide MT traffic to UE 205.

As further shown in FIG. 4, process 400 may include receiving, by the PGW and from the application server device, mobile terminated (MT) traffic that is associated with the public IP address and the public port identifier (block 450). For example, PGW 230 may receive, from application server device 245, MT traffic that includes the public IP address and the public port identifier provided by IP flow controller 235.

In this way, PGW 230 is able to receive MT traffic with a public IP address that is associated with the private IP address of UE 205, thereby allowing PGW 230 to perform NAPT to allow UE 205 to receive the MT traffic.

As further shown in FIG. 4, process 400 may include translating the public IP address to a private IP address and the public port identifier to a private port identifier (block 460). For example, PGW 230 may translate the public IP address to a private IP address, and may translate the public port identifier to a private port identifier to allow the MT traffic to be provided to UE 205.

In some implementations, PGW 230 may use the NAPT mapping table to translate the public IP address associated with the MT traffic to the private IP address. For example, the MT traffic may include the public IP address, and PGW 230 may use the public IP address to search the NAPT mapping table to identify the private IP address. Additionally, PGW 230 may use the NAPT mapping table to translate the public port identifier to the private port identifier.

In some implementations, PGW 230 may provide the MT traffic to UE 205. For example, PGW 230 may provide the MT traffic to one or more other network devices (e.g., base station 210, MME 215, SGW 220, etc.), and the one or more other network devices may provide the MT traffic to UE 205.

In this way, PGW 230 is able to translate IP address and port information to allow the MT traffic to be sent to UE 205.

As further shown in FIG. 4, process 400 may include providing an instruction to a firewall to prevent traffic flow through the firewall based on a pinhole rule of the one or more pinhole rules (block 470). For example, a pinhole duration rule may indicate a duration at which to allow traffic flow through the firewall, and, at the expiration of the duration, a network device (e.g., PGW 230, IP flow controller 235, etc.) may provide an instruction to the firewall to prevent traffic flow.

In some implementations, PGW 230 may provide an instruction to the firewall to prevent traffic flow via the firewall. For example, assume PGW 230 stores the one or more pinhole rules, and that a pinhole duration rule indicates to allow traffic flow for 24 hours. In this case, after 24 hours, PGW 230 may provide an instruction to the firewall to update a firewall configuration settings that may cause the firewall to prevent subsequent traffic flow. The instruction may be to remove the IP address information and the port information from the active configuration of the firewall. Alternatively, IP flow controller 235 may store and monitor the one or more pinhole rules, and may provide an instruction to PGW 230 to prevent traffic via the firewall (and PGW 230 provide the instruction to the firewall). Alternatively, the firewall may be configured to automatically prevent traffic flow at the expiration of the pinhole duration rule. In this case, the firewall may instruct PGW 230 that the pinhole has been closed, to allow the PGW to instruct the IP flow controller to update the NAPT mapping table.

In some implementations, IP flow controller 235 and/or PGW 230 may receive an indication to prevent traffic flow via the firewall. For example, if UE 205 closes the network connection, then PGW 230 and/or IP flow controller 235 may provide an instruction to the firewall to prevent traffic flow.

In some implementations, a pinhole rule may indicate a fixed time period for the firewall to allow traffic flow. In this case, PGW 230, IP flow controller 235, or the firewall may perform actions to prevent traffic flow when the fixed time period expires. In some implementations, a pinhole rule may indicate to allow traffic flow unless a fixed amount of wait time (e.g., inactivity) occurs. For example, if a fixed amount of time passes without traffic traveling through the firewall using the allowed IP address information and port information, then PGW 230 or IP flow controller 235 may provide an instruction to prevent traffic flow and/or the firewall may prevent traffic flow.

In some implementations, PGW 230 or the firewall may prevent traffic flow through the firewall based on a pinhole access. For example, as described elsewhere herein, an access rule may allow all devices to provide traffic flow through the firewall, allow some devices to provide traffic flow through the firewall (e.g., a select list of IP addresses), prevent some devices from providing traffic flow through the firewall (e.g., a select list of IP addresses), or the like. In this case, if a device attempts to provide traffic flow through the firewall, but is not permitted access via the pinhole access rule, then PGW 230 or the firewall may prevent traffic flow from the device.

In some implementations, application server device 245 may request to prevent traffic flow associated with the allowed IP address information and port information, or may provide a time period within which traffic flow is to be allowed. In this case, application server device 245 may provide the request to IP flow controller 235 and/or PGW 230, which may cause PGW 230 to instruct the firewall to carry out the request.

In some implementations, the firewall may detect attempted unauthorized entry. In this case, the firewall may prevent the unauthorized user from sending and/or receiving traffic via the firewall. Additionally, the firewall may temporarily prevent authorized users from sending and/or receiving traffic, and may provide the authorized users with a new public IP address and public port. Additionally, PGW 230 may provide an indication of the unauthorized entry to IP flow controller 235, and IP flow controller 235 may update the NAPT mapping table (e.g., by associating the previously used private IP address with the new public IP address).

Additionally, or alternatively, PGW 230 may provide an instruction to a firewall to update a pinhole rule. For example, PGW 230 may receive an instruction (e.g., from UE 205, from IP flow controller 235, etc.) to update the an access rule and/or a duration rule (e.g., by extending access to additional devices, by removing access from particular devices, by modifying a duration at which to keep the pinhole open, etc.). In this case, PGW 230 may provide an instruction to the firewall to update the access rule and/or the duration rule.

In this way, IP flow controller 235 enables the firewall to create a pinhole that allows application server device 245 to perform MT communications with UE 205. By assigning private IP addresses, IP flow controller 235 conserves network resources (e.g., by avoiding permanently assigning a public IP addresses to UE 205). Furthermore, by creating a pinhole using a port identifier (e.g., a port identifier associated with port 15,000+), IP flow controller 235 improves network security.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, public port may refer to a port associated with a public IP address and private port may refer to a port associated with a private IP address. Public port identifier may refer to a port identifier for a port associated with a public IP address. Private port identifier may refer to a port identifier for a port associated with a private IP address.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first network device, comprising:
one or more memories; and
one or more processors, communicatively coupled to the one or more memories, to:
provide, to a second network device, a flow control request for user equipment (UE) that is registered for an internet protocol (IP) pinhole service;
receive, from the second network device, a flow control response that includes at least one of:
IP address information,
port information, or
one or more pinhole rules;
update, based on the flow control response, a configuration of a firewall to create a pinhole;
provide, to the second network device and based on updating the configuration, an indication that the IP pinhole service is active;
receive, from an application server device, network traffic that is associated with at least one of:
a public IP address, or
a public port identifier;
translate, using a mapping table, at least one of:
the public IP address to a private IP address associated with the UE, or
the public port identifier to a private port identifier associated with the UE; and
allow the network traffic through the firewall based on the pinhole and at least one of:
the private IP address, or
the private port identifier.

2. The first network device of claim 1, wherein:
the IP address information includes the public IP address and the private IP address, and
the port information includes the public port identifier and the private port identifier.

3. The first network device of claim 1, wherein the one or more pinhole rules include at least one of:
an access rule defining devices eligible to use the IP pinhole service,
a second access rule defining one or more devices that are ineligible to use the IP pinhole service, or
a duration rule defining a period of time the pinhole is to be open.

4. The first network device of claim 1, wherein the one or more processors are further to:
receive an instruction to update a pinhole rule of the one or more pinhole rules; and
update the configuration based on the pinhole rule.

5. The first network device of claim 1, wherein the one or more processors are further to:
receive data indicating that the pinhole has been closed; and
cause the mapping table to be updated based on receiving the data.

6. The first network device of claim 5, wherein the one or more processors, when causing the mapping table to be updated, are to at least one of:
remove, from the mapping table, an association between the public IP address and the private IP address; or
remove, from the mapping table, an association between the public port identifier and the private port identifier.

7. A non-transitory computer-readable medium storing instructions, the instructions comprising:
one or more instructions that, when executed by one or more processors, cause the one or more processors to:
provide, to a device, a flow control request for user equipment (UE) that is registered for an internet protocol (IP) pinhole service;
receive, from the device, a flow control response that includes at least one of:
IP address information,
port information, or
one or more pinhole rules;
update, based on the flow control response, a configuration of a firewall to create a pinhole;
provide, to the device and based on updating the configuration, an indication that the IP pinhole service is active;
receive, from an application server device, network traffic that is associated with at least one of:
a public IP address, or a public port identifier;
translate, using a mapping table, at least one of:
the public IP address to a private IP address associated with the UE, or
the public port identifier to a private port identifier associated with the UE; and
allow the network traffic through the firewall based on the pinhole and at least one of:
the private IP address, or
the private port identifier.

8. The non-transitory computer-readable medium of claim 7, wherein:
the IP address information includes the public IP address and the private IP address, and
the port information includes the public port identifier and the private port identifier.

9. The non-transitory computer-readable medium of claim 7, wherein the one or more pinhole rules include at least one of:
an access rule defining devices eligible to use the IP pinhole service,
a second access rule defining one or more devices that are ineligible to use the IP pinhole service, or
a duration rule defining a period of time the pinhole is to be open.

10. The non-transitory computer-readable medium of claim 7, wherein the one or more instructions further cause the one or more processors to:
receive an instruction to update a pinhole rule of the one or more pinhole rules; and
update the configuration based on the pinhole rule.

11. The non-transitory computer-readable medium of claim 7, wherein the one or more instructions further cause the one or more processors to:
receive data indicating that the pinhole has been closed; and
cause the mapping table to be updated based on receiving the data.

12. The non-transitory computer-readable medium of claim 11, wherein the one or more instructions, that cause the one or more processors to cause the mapping table to be updated, further cause the one or more processors to at least one of:
remove, from the mapping table, an association between the public IP address and the private IP address; or
remove, from the mapping table, an association between the public port identifier and the private port identifier.

13. A method, comprising:
providing, by a first device and to a second device, a flow control request for user equipment (UE) that is registered for an internet protocol (IP) pinhole service;
receiving, by the first device and from the second device, a flow control response that includes at least one of:
IP address information,
port information, or
one or more pinhole rules;
updating, by the first device and based on the flow control response, a configuration of a firewall to create a pinhole;
providing, by the first device and to the second device and based on updating the configuration, an indication that the IP pinhole service is active;
receiving, by the first device and from an application server device, network traffic that is associated with at least one of:
a public IP address, or
a public port identifier;
translating, by the first device and using a mapping table, at least one of:
the public IP address to a private IP address associated with the UE, or
the public port identifier to a private port identifier associated with the UE; and
allowing, by the first device, the network traffic through the firewall based on the pinhole and at least one of:
the private IP address, or
the private port identifier.

14. The method of claim 13, wherein:
the IP address information includes the public IP address and the private IP address, and
the port information includes the public port identifier and the private port identifier.

15. The method of claim 13, wherein the one or more pinhole rules include at least one of:
an access rule defining devices eligible to use the IP pinhole service,
a second access rule defining one or more devices that are ineligible to use the IP pinhole service, or
a duration rule defining a period of time the pinhole is to be open.

16. The method of claim 13, further comprising:
receiving an instruction to update a pinhole rule of the one or more pinhole rules; and
updating the configuration based on the pinhole rule.

17. The method of claim 13, further comprising:
receiving data indicating that the pinhole has been closed; and
causing the mapping table to be updated based on receiving the data.

18. The method of claim 13, wherein causing the mapping table to be updated comprises:
removing, from the mapping table, an association between the public IP address and the private IP address; or
removing, from the mapping table, an association between the public port identifier and the private port identifier.

* * * * *